United States Patent [19]

Detwiler

[11] Patent Number: 5,108,062

[45] Date of Patent: Apr. 28, 1992

[54] PIVOT APPARATUS

[75] Inventor: Paul O. Detwiler, New Concord, Ohio

[73] Assignee: NCR Corporation, Dayton, Ohio

[21] Appl. No.: 590,577

[22] Filed: Sep. 28, 1990

[51] Int. Cl.[5] .......................................... F16M 13/00
[52] U.S. Cl. .................................. 248/185; 248/923;
248/291; 248/278; 16/385; 403/84
[58] Field of Search ................ 248/185, 919-923,
248/291, 176, 278; 16/385; 403/84

[56] References Cited

U.S. PATENT DOCUMENTS

| 3,179,361 | 4/1965 | O'Brien | 248/185 X |
|---|---|---|---|
| 3,531,823 | 12/1967 | Cornelius | 16/191 |
| 4,589,713 | 5/1986 | Pfuhl et al. | 339/7 |
| 4,624,434 | 11/1986 | Lake, Jr. et al. | 248/923 X |
| 4,645,153 | 2/1987 | Granzow et al. | 248/178 |
| 4,666,068 | 5/1987 | Bush | 222/546 |
| 4,696,412 | 9/1987 | McGowan et al. | 220/335 |
| 4,701,977 | 10/1987 | Hori et al. | 16/266 |
| 4,731,903 | 3/1988 | Kennedy et al. | 16/224 |
| 4,790,504 | 12/1988 | Wills et al. | 248/183 |
| 4,986,507 | 1/1991 | Chiang | 248/923 X |

Primary Examiner—Alvin C. Chin-Shue
Attorney, Agent, or Firm—Richard W. Lavin

[57] ABSTRACT

A disengageable tilt apparatus supports a structure such as an optical scanner for moving and supporting the scanner between vertical and horizontal positions and includes a support member having a cylindrical recessed portion within which is positioned a plastic flexible pivot member which applies a frictional force on the recessed portion to allow the scanner to be rotated and held in an operating position. The pivot member comprises a W-shaped member secured to the scanner having flexible arm members whose outer contact surface coincides with the cylindrical surface of the recessed portion to apply the frictional force.

16 Claims, 7 Drawing Sheets

PIVOT APPARATUS

CROSS REFERENCE TO RELATED APPLICATION

Compact Optical Scanner, co-pending application, NCR Dkt. No. 4873, filed on even date herewith, invented by Paul O. Detwiler, assigned to the NCR Corp.

Optical Scanner or Similar Article, copending application, NCR Dkt. No. 4823, filed on even date herewith, invented by Donald L. Forsythe and David M. Allgeier, assigned to the NCR Corp.

BACKGROUND OF INVENTION

The present invention relates to pivot arrangements and more particularly to an apparatus for tilting and rotating a structure such as a optical bar code scanning apparatus which can be mounted on a check-out counter in either a vertical or horizontal position for scanning bar code labels on a merchandise article which is moved past a scanning aperture located in the bar code scanner.

In present-day merchandising point-of-sale operations, data pertaining to the purchase of a merchandise item is obtained by reading data encoded indicia or symbols such as a bar code printed on the merchandise item. In order to standardize the bar codes used in various point-of-sale checkout systems, the grocery industry has adapted a uniform product code (UPC) which is in the form of a bar code. Various reading systems have been constructed to read this type of bar code, including hand-held wands which are moved across the bar code and stationary optical reader systems normally located within the checkout counter in which the bar code is read by projecting a plurality of scanning light beams through a window constituting the scanning area of the counter over which the bar code printed on a purchased merchandise item or on a bar code label attached to the merchandise item is moved. This scanning operation is normally part of the process of loading the item in a shopping cart. It would be desirable to have a compact optical scanner which can be rotated between a vertical and a horizontal position allowing merchandise items to be conveniently read by passing the merchandise item either over or under the scanning apparatus thereby increasing the speed of processing the merchandise item through the checkout system.

SUMMARY OF THE INVENTION

There is provided, in accordance with the present invention an apparatus which is mounted for rotation to a support member molded of a plastic material. The apparatus is mounted within a housing member which includes a lower portion having a horizontally extending pivot member which is removeably inserted into a hollow cylindrical portion of the support member. The pivot member is molded of a plastic material and includes a pair of flexible arm portions which frictionally engage the inside surface of the cylindrical portion of the support member to rotatably support the housing member for movement between a horizontal and a vertical position.

It is therefore a principal object of this invention to provide a support structure for an apparatus which enables the apparatus to be move between a horizontal and vertical operating position.

It is a further object of this invention to provide a support structure which is simple in construction and therefore low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanied drawings wherein like reference numerals indicate like or corresponding parts throughout the several views and wherein.

DESCRIPTION OF THE PREFERRED EMBODIMENT

Figure 1:
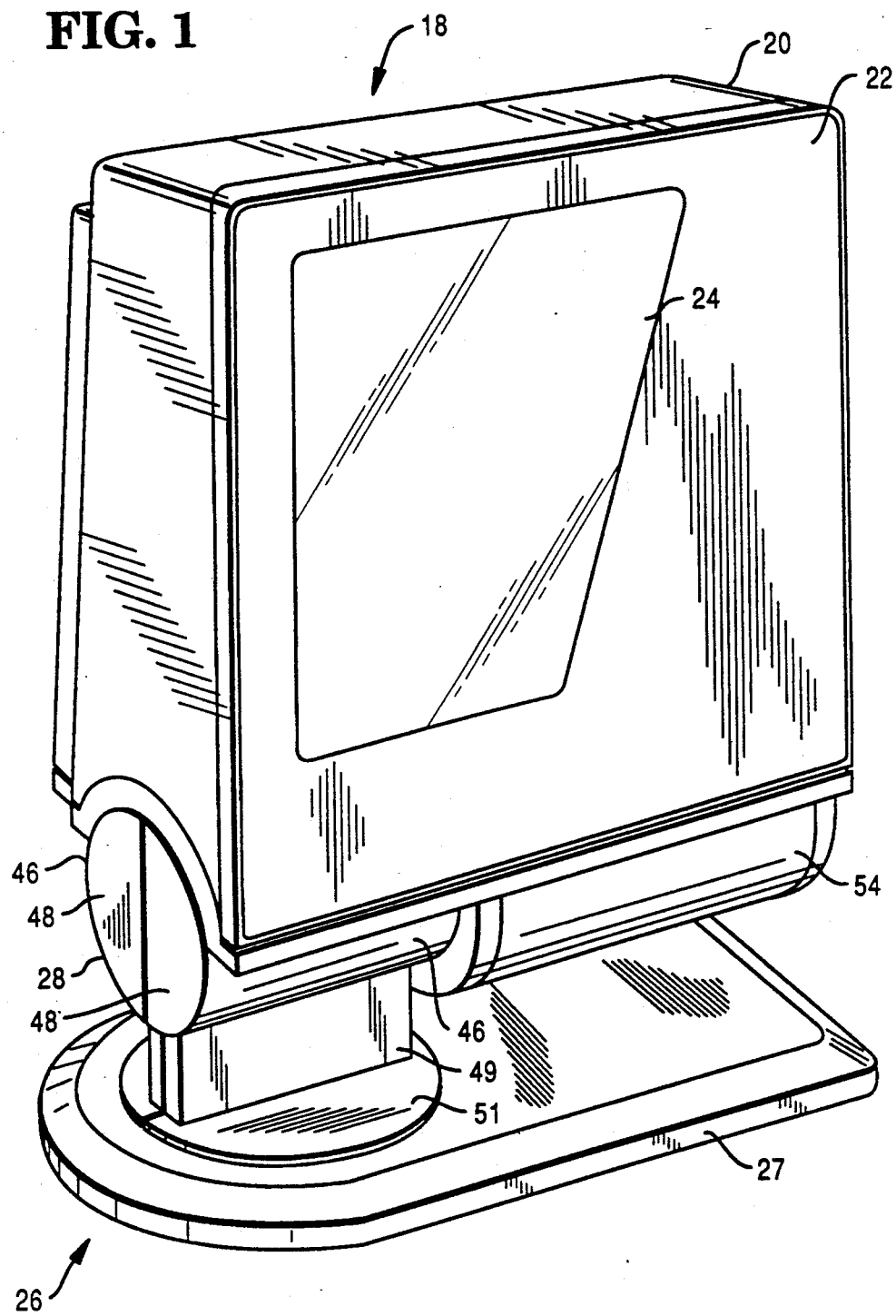
FIG. 1 is a perspective view of an optical scanner shown in a vertical position which includes the support structure of the present invention.

Referring now to FIG. 1 there is shown a perspective view of the optical scanner generally indicated by the numeral 18 which includes a box-like housing member 20 having a front cover portion 22 in which is located a transparent apperent aperture 24. The housing member 20 is rotatably mounted on a support member generally indicated by the numeral 26 which includes a base member 27 and a clam shell socket member 28 mounted in the base member 27 and to which the housing member 20 is rotatably secured for frictional movement about the socket member in a manner to be described hereinafter.

Figure 2:
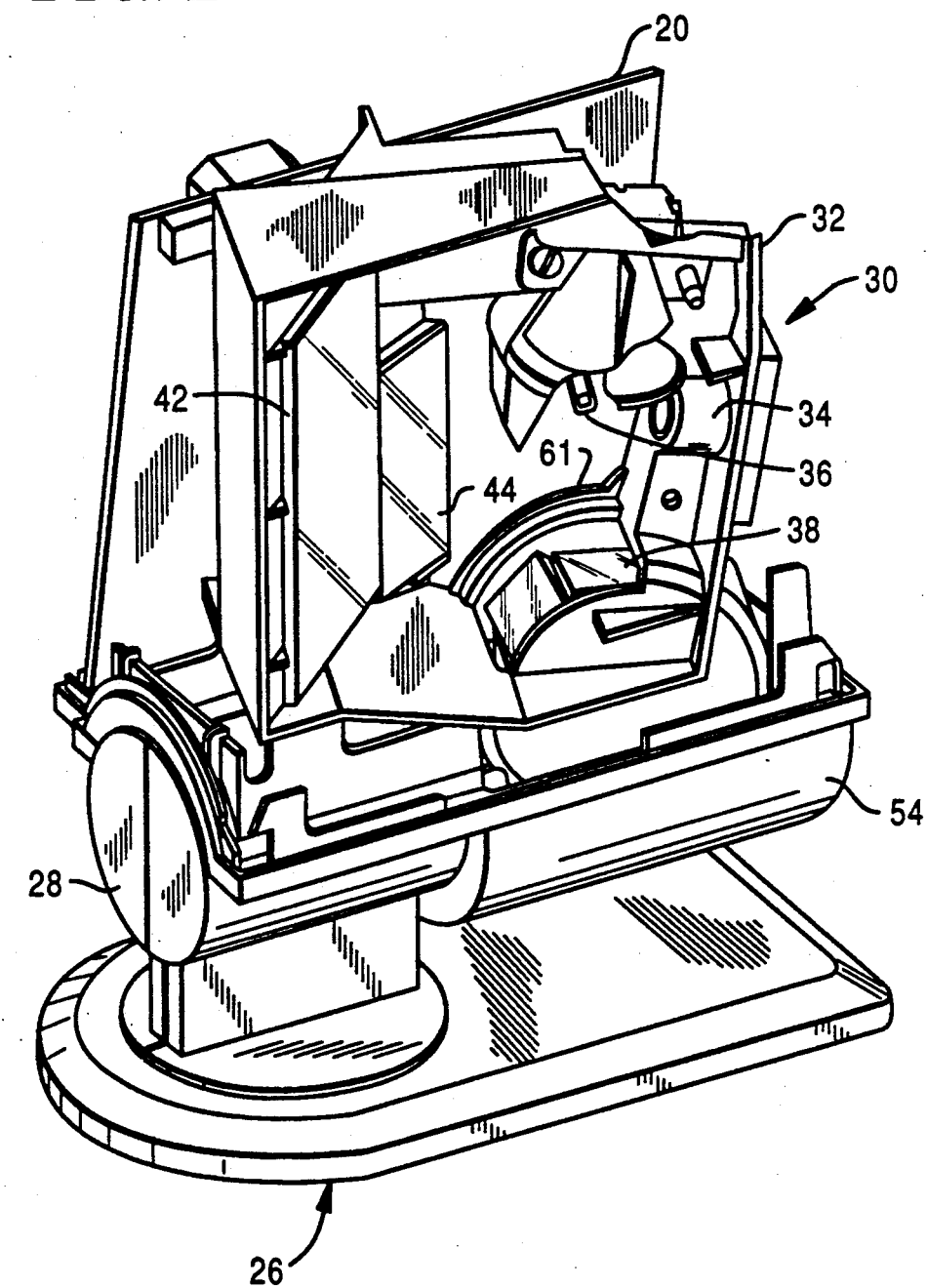
FIG. 2 is a perspective view similar to FIG. 1 with a portion of the outer housing cover removed showing details of the optical scanner.

Referring now to FIG. 2 there is shown a perspective view of the scanning apparatus for generating scanning light beams which is generally indicated by the numeral 30 with a portion of the housing member 20 removed. The scanning apparatus 30 includes an box-like inner housing member 32 with the front portion of such housing member being open which is positioned adjacent the aperture 24 (FIG. 1) of the housing member 20. The inner housing member 32 includes a cylindrical portion 34 within which is mounted a visible laser diode (not shown) for projecting a laser light beam to a molded routing mirror 36 which deflects the laser light beam along a light path for engagement with one of eight plano reflecting mirrors 38 of a rotating spinner member 40.

The reflecting mirrors or facets 38 are set at various angles with respect to the axis of rotation of the spinner member 40. Four of these facets will reflect the received laser light beam in a direction which strikes a large pattern mirror 42 while the remaining four facets will reflect the laser light beam at a small pattern forming mirror 44 located adjacent the large pattern forming mirror 42 for reflecting the light beams in the form of a scanning pattern through the aperture 24 (FIG. 1). For a complete description of the scanning apparatus 30, reference should be made to the previously cited co-pending patent application NCR Docket No. 4873 filed on even date herewith.

Figure 3:
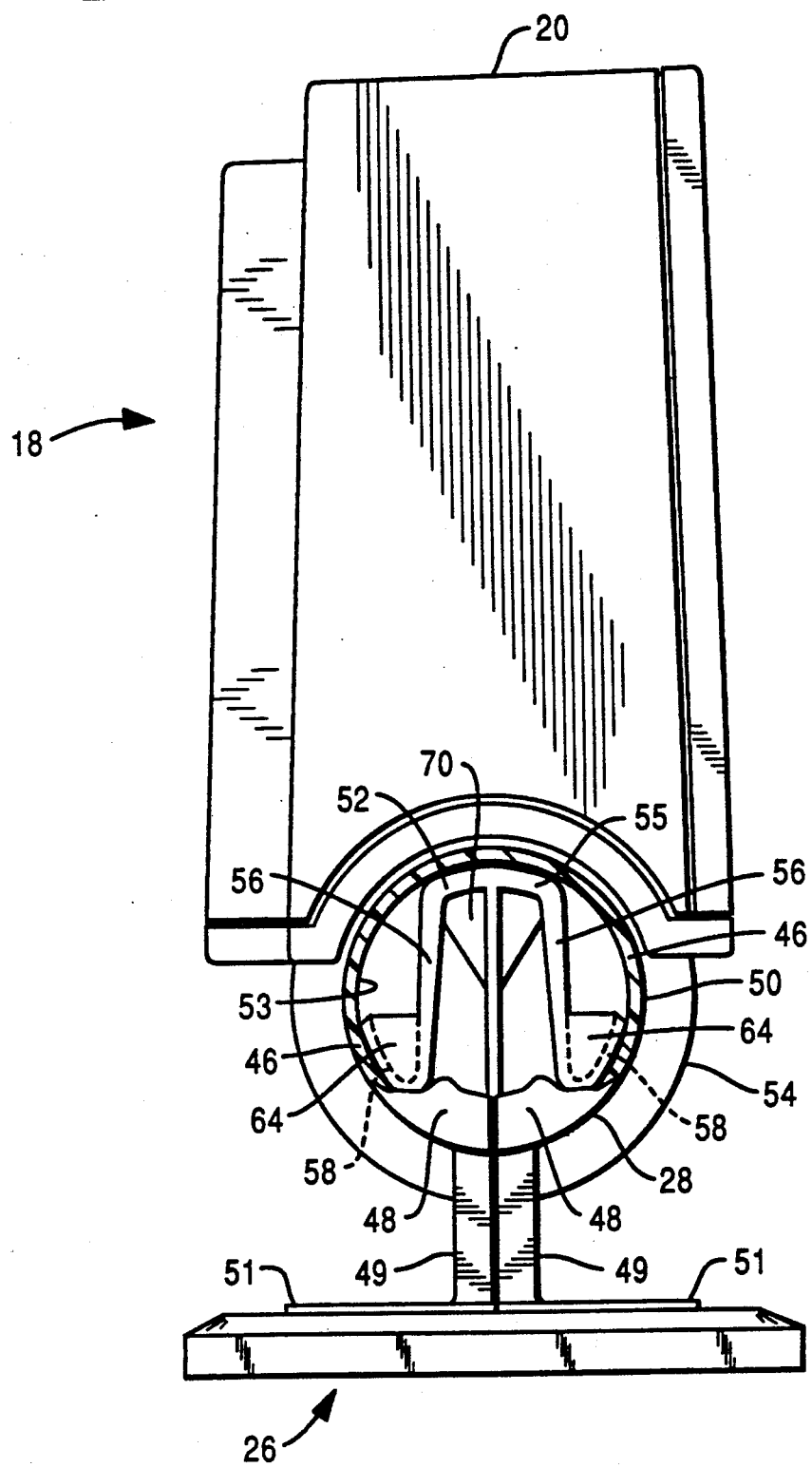
FIG. 3 is a side view of the optical scanner showing details be support structure for rotating the optical scanner between a horizontal and vertical position.
Figure 4A:
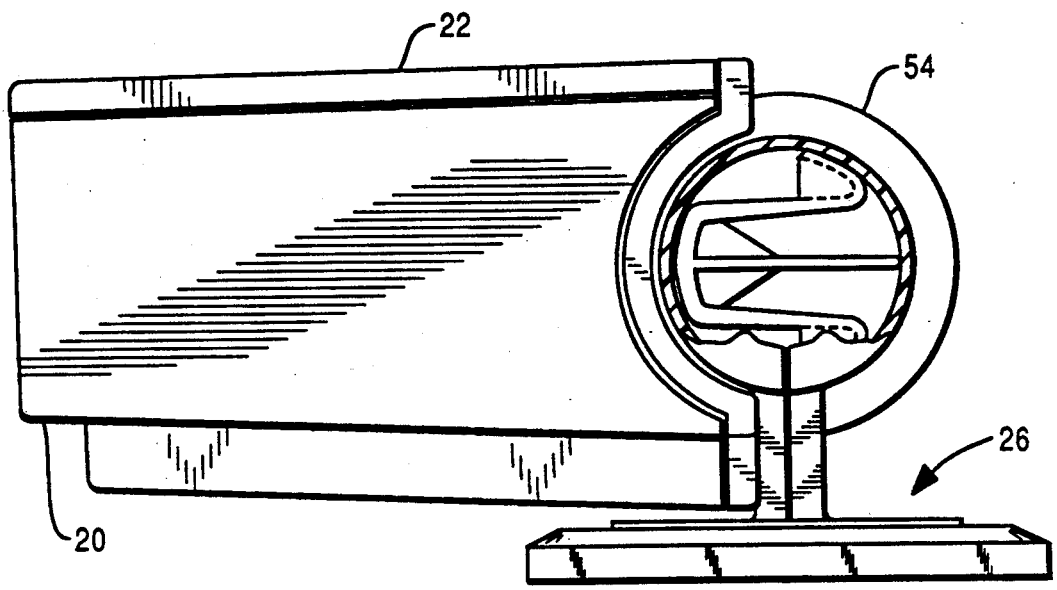
FIG. 4A is a side view of the optical scanner rotated to a horizontal position over which a bar code is moved during a scanning operation.
Figure 4B:
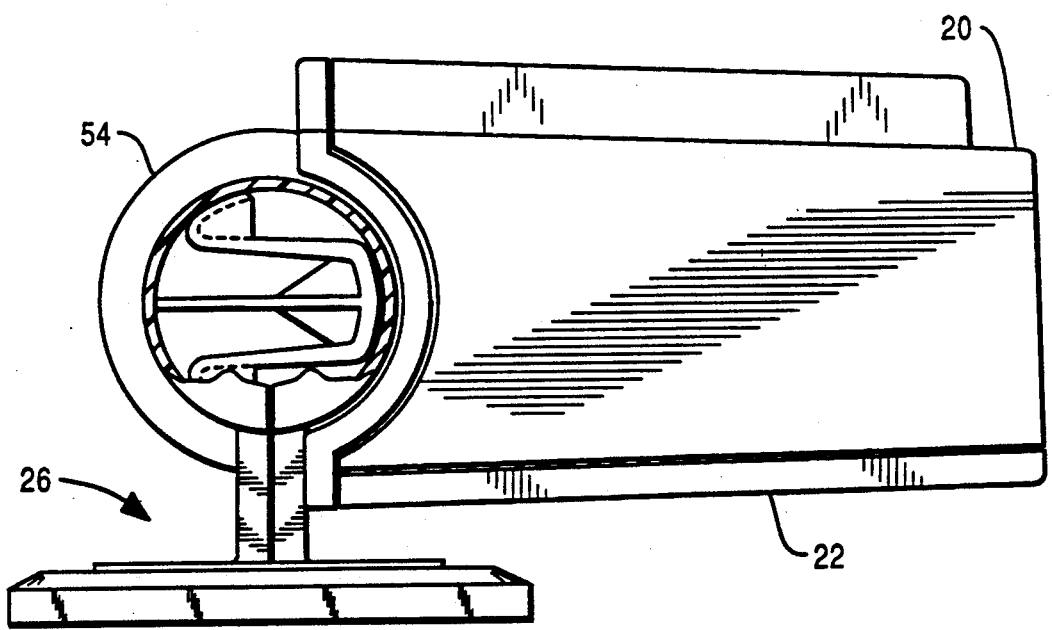
FIG. 4B is a side view of the optical scanner rotated to a horizontal position under which a bar code is moved during as scanning operation.
Figure 8:
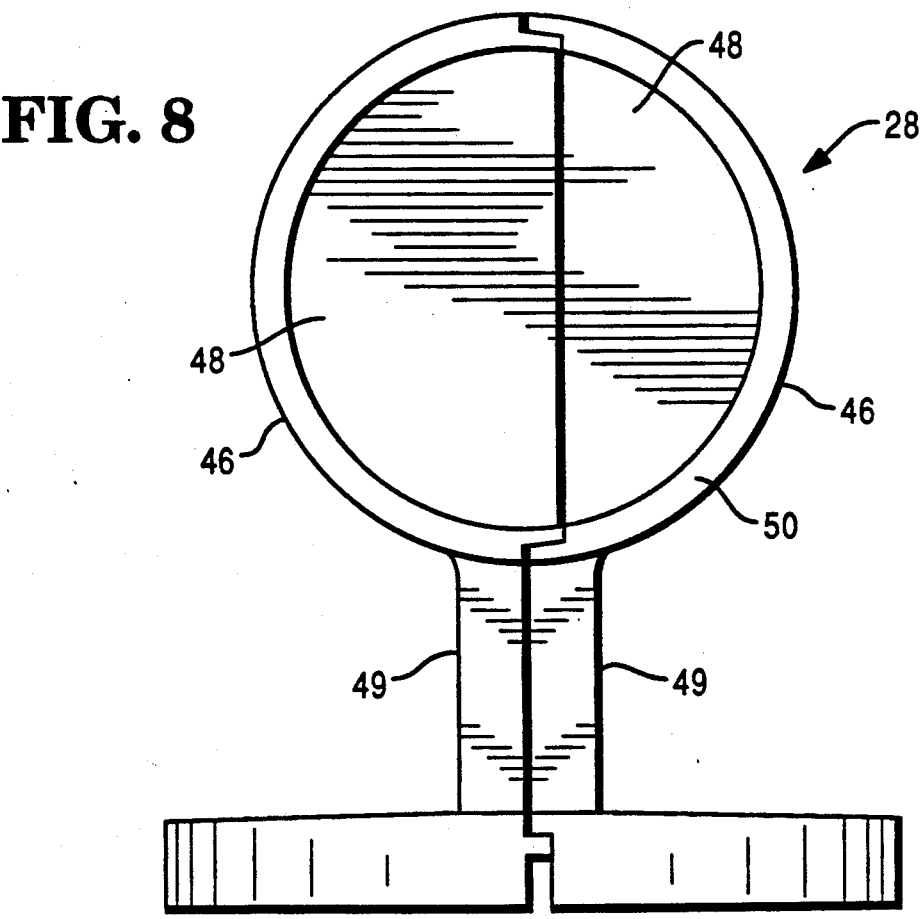
FIG. 8 is a side detail view of the clam shell socket structure.

Referring to FIG. 3 there is shown a side view of the housing member 20 (FIG. 1) with the sidewall portion of the socket member 28 removed showing details of the pivot member allowing the housing member 20 (FIG. 1) to be rotated about the socket member 28. The socket member 28 is comprised of a pair of clam shell members 46 (FIG. 8), each having one end enclosed by a side wall portion 48 (FIGS. 1 and 8), and which are joined together to form a hollow cylinder 50. The clam shell members include a depending leg portion 49 having a base portion 51 which when inserted into the base member 27 will form the socket member 28. Removeably inserted into the open end of the cylinder 50 is a pivot member 52 secured to the cylindrically shaped lower housing portion 54 of the housing member 20. The pivot member 52 which is composed of a polycarbonate plastic material is molded in a generally W-shaped configuration (FIGS. 3 and 8) and includes an elongated body portion 55 (FIG. 6) having a pair of depending flexible arm portions 56. Each of the arm portions 56 includes an upturned curved end portion 58 which when inserted into the cylinder 50 will be compressed by the inner wall surface 53 of the cylinder 50. The engagement of the wall surface 53 by the flexible end portions 58 provides a frictional drag on the cylinder 50 when the housing member 20 is rotated, enabling the housing member to be located in any scanning position between the vertical position (FIG. 1) and the horizontal position (FIGS. 4A and 4B).

Figure 5:
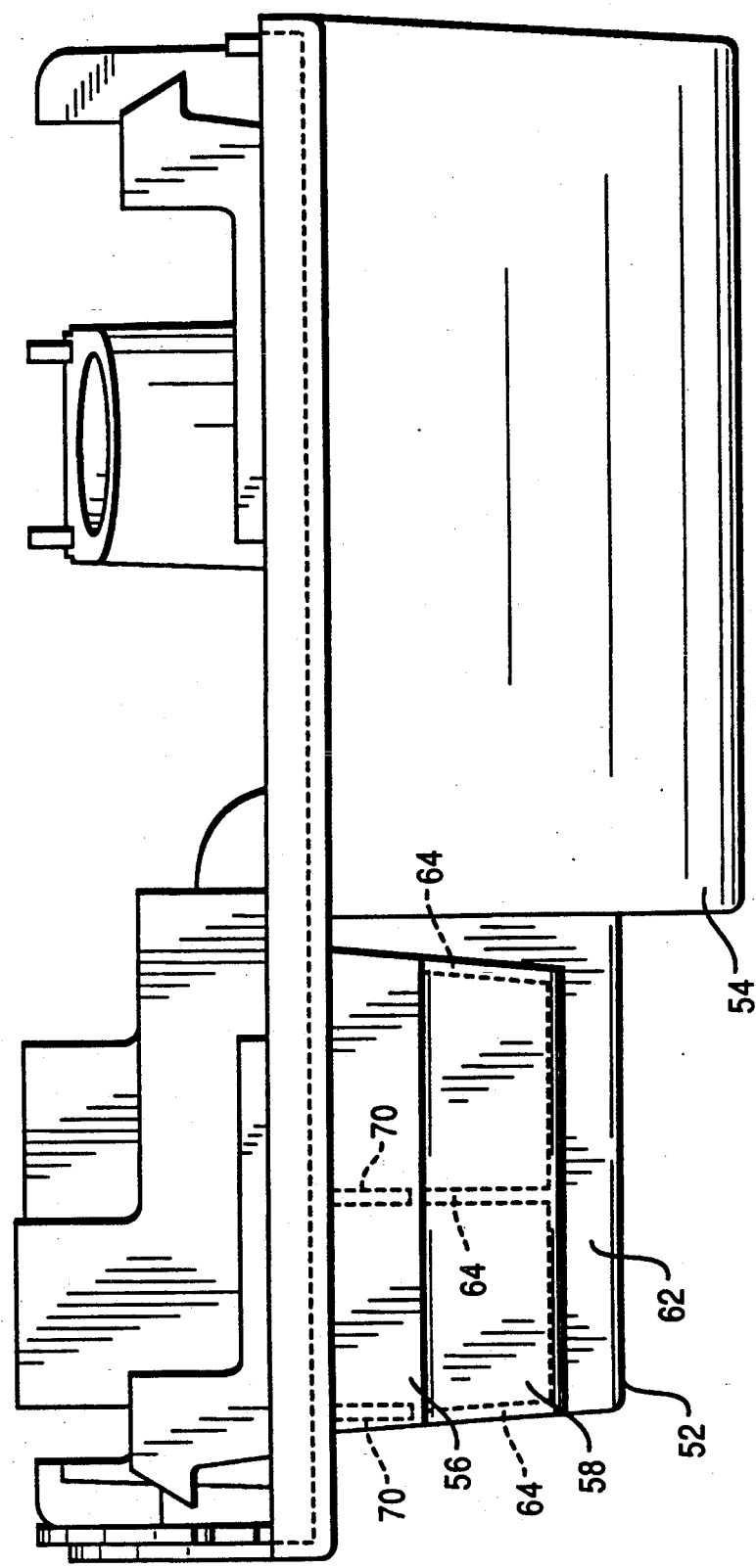
FIG. 5 is a side view of the lower housing portion of the scanner housing showing details of the pivot member.
Figure 6:
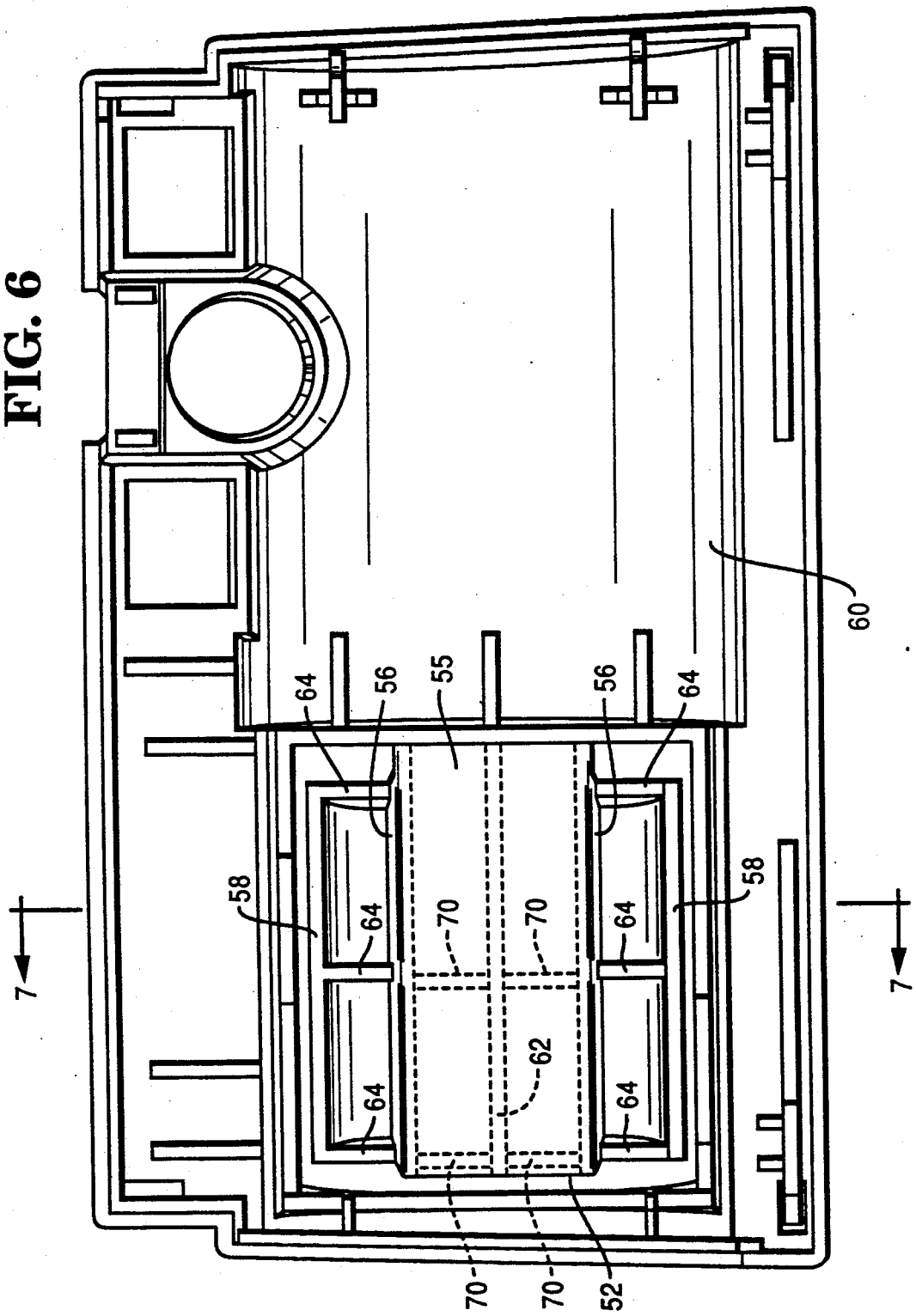
FIG. 6 is a top view of the lower housing portion shown in FIG. 5.
Figure 7:
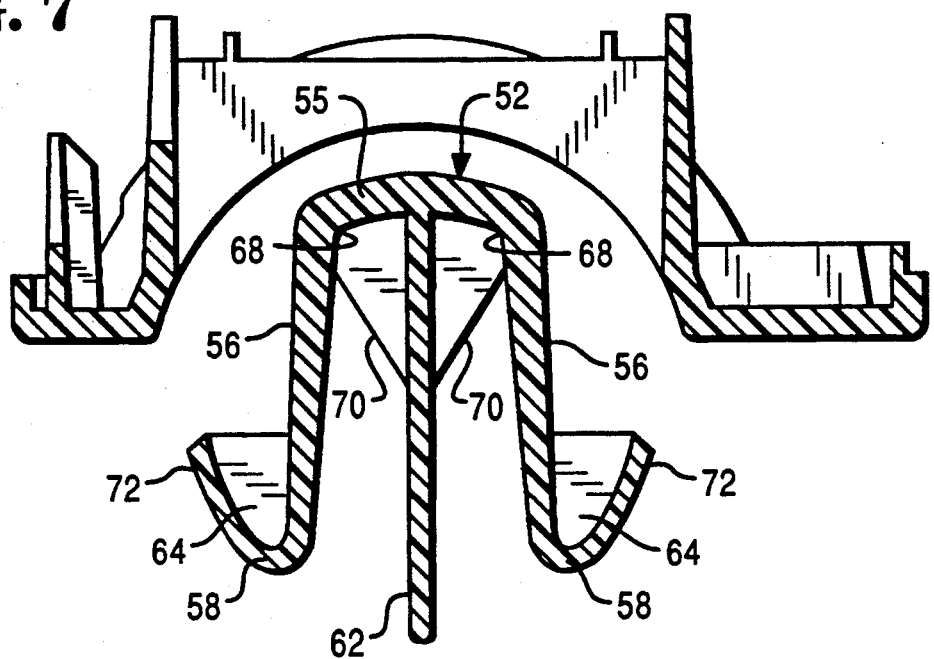
FIG. 7 is a sectional view taken on lines 7—7 of FIG. 6 showing the configuration of the pivot member

Referring now to FIGS. 5-7 inclusive, there are shown various views of the pivot member 52. The pivot member is molded as one end of the lower housing portion 54 of the housing member 20 in which the other end of the housing portion includes a recessed portion 60 (FIG. 6) within which is positioned the spinner member 61 of the scanning apparatus 30 (FIG. 2) when the housing portion 54 is mounted to the scanning apparatus and the housing member 20. The pivot member 52, the housing portion 54 and the housing members 20 and 32 are molded of a polycarbonate material such as POLYCARBONATE/ABS BAYBLEND which is commercially available from the Mobay Corp. of Pittsburgh, Pa., 15205-9741. Extending along and depending from the center of the elongated body portion 55 of the pivot member 52 is a rib member 62 (FIGS. 5 and 7) for providing stability to the pivot member. As best seen from FIGS. 6 and 7, each of the flexible end portions 58 includes a plurality of rib portions 64 connecting the end portions 58 to the arm portions 56 which transfer the flexing movement of the end portions 58 when mounted within the cylinder 50 to the arm portions. With this construction, the stresses developed by the flexing movement of the arm portions will be concentrated at the junction 68 (FIG. 7) of the arm portions 56 and the body portion 55. In order to absorb these stresses, a pair of rib sections 70 are mounted between the rib member 62, the body portion 55 and the arm portions 56 as shown in FIGS. 3 and 4-6 inclusive to transfer the stresses to the rib member 62. The pivot member 52 is molded integral with the end of the lower housing portion 54 through the rib member 62 and the body portion 55 while the arm portions 56 (FIG. 5) are free to be deflected when the pivot member is inserted into the cylindrical portion 50 of the support member 26.

As best seen from FIGS. 3 and 7, the outer surface 72 of the flexible end portions 58 represents the ark of a circle whose diameter is slightly larger than the inside diameter of the cylindrical portion 50 of the support member. When inserted into the cylindrical portion 50, the end portions 58 and the arm portions 56 of the pivot member 52 will deflect, applying a frictional force on the inside surface 53 of the cylindrical portion 50, allowing the housing member 20 to be rotated between a vertical (FIG. 1) and a horizontal position (FIGS. 4A and 4B), enabling the optical scanner to be used in a variety of checkout configurations. The present invention allows the pivot member and the scanner to be easily removed from the support member 26 when it is necessary to repair the scanner. This arrangement also allows a single scanner to be used with more than one support member, enabling a greater use of the scanner within a place of business.

Although the preferred embodiment of the present invention has been described herein, it is not intended that the invention be restricted thereto but that it be limited only by the true spirit and scope of the appended claims.

What is claimed is:

1. An apparatus for rotatably supporting a structure comprising:
    a support member having a recessed portion; and
    a structure mounted on said support member for movement between a horizontal and a vertical position having a flexible solid pivot member composed of a resilient material which is adapted to be inserted into said recessed portion, said pivot member being deformed when inserted within the recessed portion for slidably engaging said recessed portion to apply a frictional force on said recessed portion enabling the structure to be rotatably supported solely by said solid pivot member for movement between a horizontal and vertical position.

2. The apparatus of claim 1 in which the recessed portion of the support member has an internal curved surface and the pivot member includes an elongated rigid portion and a curved flexible portion which is deflected when inserted into the recessed portion to exert a frictional force on the internal curved surface of the recessed portion of the support member.

3. The apparatus of claim 2 in which the flexible portion of the pivot member has an outer curved surface extending through an arc of an circle which is similar to the internal curved surface on the recessed portion of the support member for slidably engaging the internal curved surface of the recessed portion to exert a frictional force on said curved surface.

4. A disengageable tilt apparatus for supporting a structure for movement between a horizontal and vertical position comprising:
    a support member having a recessed portion;
    a housing member for housing the structure; and
    a solid pivot member composed of a resilient material and extending outwardly in a horizontal direction from the housing member for insertion into the recessed portion of the support member for slidably engaging said recessed portion, said pivot member being deformed when inserted within the recessed portion to exert a frictional force on the recessed portion, said pivot member solely supporting said structure enabling the structure to be rotatably supported by said pivot member for movement between a horizontal and vertical position.

5. The apparatus of claim 4 in which the recessed portion of the support member has an internal curved surface and the pivot member includes an elongated rigid portion and a curved flexible portion which is deflected when inserted into the recessed portion to exert a frictional force on the internal curved surface of the recessed portion of the support member.

6. The apparatus of claim 5 in which the flexible portion of the pivot member has an outer curved surface extending through an arc of a circle which is similar to the internal curved surface of the recessed portion of the support member for slidably engaging the internal curved surface of the recessed portion to exert a fraction force of said curved surface for rotatably supporting said housing member.

7. An apparatus for rotatably supporting a structure comprising:
   a support member having a recessed portion including an internal curved surface; and
   a structure mounted on said support member for movement between a horizontal and a vertical position having a flexible pivot member composed of a resilient material and including a rigid portion and a flexible portion which is deflected when inserted into the recessed portion to exert a frictional force on the internal curved surface of the recessed portion of the support member, said pivot member comprising a W-shaped member with the rigid portion including a centrally located rib member and the flexible portion including a pair of opposed movable arm members, each of said arm members having an end portion with and outer curved surface which is similar to the internal curved surface of the recessed portion of the support member for slidably engaging the internal curved surface to exert a frictional force on said internal curved surface.

8. The apparatus of claim 7 in which the end portions are curved in an outward direction and in which the outer curved surface is formed as a part of an arc of a circle, said recessed portion comprising a hollow cylinder in which the internal surface of the cylinder is slidably engaged by the outer curved surface of the end portions to frictionally support said structure.

9. The apparatus of claim 7 in which the pivot member includes first rib portions mounted between the rib member and the arm members for absorbing the frictional force exerted by the end portions of the arm members on the curved surface of the recessed portion of the support member.

10. The apparatus of claim 4 in which the pivot member includes second rib portions mounted between the outer curved surface of the end portions and the arm members to deflect the arm members upon the end portions engaging the curved surface of the recessed portion of the support member.

11. Apparatus of claim 7 in which the support member comprises a pair of clam shell members joined to form a hollow cylinder, said clam shell members each including a depending base member for supporting the clam shells and the structure for movement between a horizontal and vertical position.

12. A disengageable tilt apparatus for supporting a structure for movement between a horizontal and vertical position comprising:
   a support member having a recessed portion including an internal curved surface;
   a housing member for housing the structure; and
   a pivot member composed of resilient material and including a rigid portion and a flexible portion extending outwardly in a horizontal direction from the housing member for insertion into the recessed portion of the support member for slidably engaging said recessed portion, said pivot member comprising a W-shaped member with the rigid portion including a centrally located rib member and the flexible portion including a pair of opposed movable arm members, said arm members each having an end portion with an outer curved surface which is similar to the internal curved surface of the recessed portion of the support member for slidably engaging the internal curved surface to exert a frictional force of said internal curved service.

13. The apparatus of claim 12 in which the end portions are curved in an upward direction and in which the outer curved surface is formed as a part of an ark of a circle, said recessed portion comprising a hollow cylinder in which the internal surface of the cylinder is slidably engaged by the outer curved surface of the end portions to frictionally support said structure.

14. The apparatus of claim 12 in which the pivot member includes first rib portions mounted between the rib member and the arm members for absorbing the frictional force exerted by the end portions of the arm members on the curved surface of the recessed portion of the support member.

15. The apparatus of claim 14 in which the pivot member includes second rib portions mounted between the outer curved surface of the end portions and the arm members to deflect the arm members upon the end portions engaging the curved surface of the recessed portion of the support member.

16. The apparatus of claim 4 in which the support member comprises a pair of clam shell members joined to form a hollow cylinder, said clam shell members each including a depending base member for supporting the clam shells and the structure for movement between a horizontal and vertical position.

* * * * *

UNITED STATES PATENT AND TRADEMARK OFFICE
CERTIFICATE OF CORRECTION

PATENT NO. : 5,108,062
DATED : Apr. 28, 1992
INVENTOR(S) : Detwiler

It is certified that error appears in the above-identified patent and that said Letters Patent is hereby corrected as shown below:

Column 5, line 22, "fraction" should be --fractional--.

Column 5, line 40, "and" should be --an--.

Column 5, line 48, "are" should be --arc--.

Signed and Sealed this

Seventeenth Day of August, 1993

Attest:

BRUCE LEHMAN

*Attesting Officer*    *Commissioner of Patents and Trademarks*